C. T. ADAMS.
NON-SKIDDING TIRE.
APPLICATION FILED JAN. 7, 1907. RENEWED FEB. 15, 1911.
1,092,419.
Patented Apr. 7, 1914.
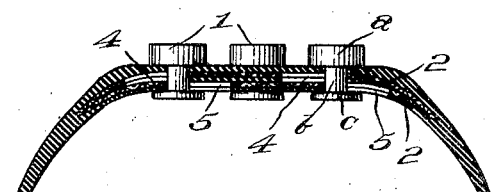
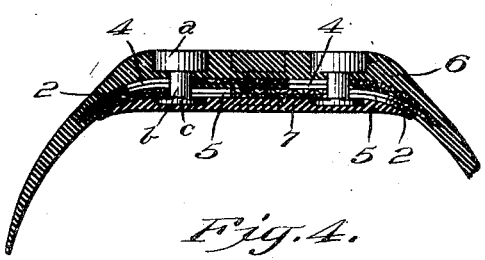
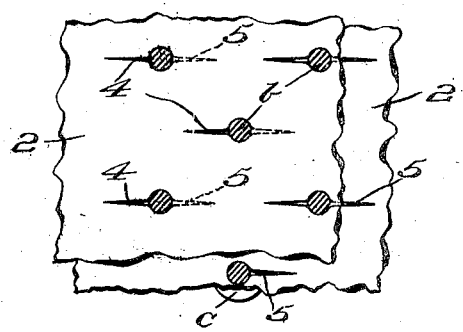
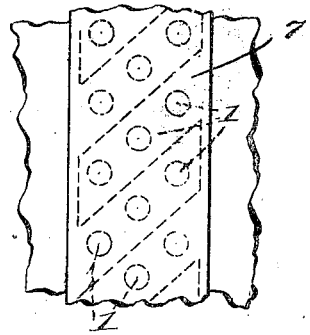
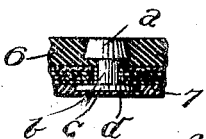

UNITED STATES PATENT OFFICE.

CALVIN THAYER ADAMS, OF NEW YORK, N. Y.

NON-SKIDDING TIRE.

1,092,419. Specification of Letters Patent. Patented Apr. 7, 1914.

Application filed January 7, 1907, Serial No. 351,258. Renewed February 15, 1911. Serial No. 608,710.

*To all whom it may concern:*

Be it known that I, CALVIN THAYER ADAMS, citizen of the United States, residing at New York city, in the county of New York and State of New York, have invented new and useful Improvements in Non-Skidding Tires, of which the following is a specification.

My invention relates to pneumatic and other rubber tires for vehicles, and consists in a tread therefor provided with studs, whereby slipping and skidding is prevented, and the tire strengthened so that the danger of punctures is much diminished.

The essential features of my invention are hard, metallic, one-piece studs and one or more plies of fabric combined with rubber. The particular formation and arrangement of the parts is also important, for thereby the studs are secured in place, without upsetting their ends and without the use of auxiliary parts. The particular advantage obtained is that studs of the hardest material may be used, such as cast, or chilled, iron, or hard steel, whereby the durability, strength and anti-slip properties of the tire are much increased.

Certain other details of construction are also new and useful.

I am aware that tires for similar purposes have been made with flush or projecting rivets inserted in leather, fabric, etc., but in all the cases with which I am acquainted, these are rivets, and are upset, or clenched, either with, or without, retaining washers and other parts, which required the use of a soft metal rivet, therefore weaker, of short life and less efficient.

Peculiar conditions are involved in pneumatic tires for automobiles. The various excessive strains to which they are subjected make it necessary that the rivets should be secured in the shoe most securely. If a limited number only tear out, or if they wear quickly, so that the life of the tire is short, commercially and practically the tire is a failure. By my construction, these hard studs are used instead of rivets and are secured in place very firmly; therefore my tread meets the requirements, and I believe is the longest lived and most efficient tire or tread ever produced.

My invention is clearly shown in the drawing herewith, in which the reference numerals of the description indicate the corresponding parts in all the views.

Figures 1, and 2 are partial cross sections showing my construction in different stages. Fig. 3 is a plan of Fig. 1 with the rivet heads removed. Fig. 4 is a plan of Fig. 2. Figs. 5 and 6 are simple modifications shown respectively, in plan and in section. In Fig. 5 the rivet is shown without the head. Figs. 7 and 8 are partial bottom plans showing special means for securing the parts together.

In the figures 1 indicates the studs having strong thick heads $a$, shanks $b$ and flat backs $c$.

2 2 are the plies of material for receiving the rivets, preferably composed each of canvas embedded in or combined with rubber. In Figs. 1, 2, 3 and 5 are shown two such plies provided each with button holes 4 and 5. By buttoning in the studs then drawing the plies so that the button holes do not register, the rivets are locked in place. In Figs. 1, 2 and 3 the plies are drawn to bring the stud shanks in the opposite ends of the button holes; in Fig. 5 the button holes are crossed, but in all a similar construction and result of non-registering button holes in superimposed plies and studs locked in place.

In Fig. 6 there is only one ply, though as thick and of as many layers as desired. Here the stud head is larger than the round hole $d$ and the back much larger, so that the head may be forced through, and the stud held securely in place.

In Fig. 2 is shown the extra sheet 6 of rubber, punched with holes to fit the rivet heads and vulcanized in place, whereby the tread is made heavier and solid, and the rivet heads flush.

A backing sheet 7 may be vulcanized over the rivet backs to protect the tire from being injured thereby. In Figs. 7 and 8 are indicated the means by which this backing is held in position over the backs. This is a row, or rows, of stitching variously arranged and extending through all the plies. This means of securing by stitching, prevents the tread working loose from the shoe, a common defect in non-skidding tires.

I call my invention a metallic rubber tire, because it contains the maximum of metal, and of hard metal, to prolong its life, but so arranged as not to diminish the desired resiliency.

Having thus described my invention, what I claim as new and desire to secure by Letters Patent, is:—

1. In a non-skidding rubber tire, a tread having a plurality of plies of yielding material, said plies being formed with button-holes and so arranged that the corresponding button-holes of the superimposed plies register throughout a small portion only of their extent, hard metal studs having their shanks arranged in said registering portions, whereby the studs are secured in place with their heads outwardly projecting and their flat backs engaging the inner surface of the inner ply.

2. In a non-skidding rubber tire, a tread composed of two plies of fabric combined with sheet rubber, said plies being provided with button-holes and arranged so that the corresponding button-holes of the two plies have one end only registering with the opposite end of the holes in the other ply, and in combination therewith hard metal studs extending through the plies with their shanks arranged in the registering portions of the button-holes, whereby the studs are locked in place.

3. In a non-skidding rubber tire, a tread having in combination two plies of yielding material provided each with a series of button-hole slits, said plies being arranged so that the corresponding slits of the superimposed plies register throughout a small portion only of their extent, hard metal studs having flat backs and thick heads arranged with their shanks in said registering portions, whereby the studs are locked in place with their heads projecting outwardly, and a supplementary sheet of yielding material secured to the outer surface of the tread with holes to fit the stud heads and arranged with its surface substantially flush with the stud heads.

4. In a non-skidding rubber tire, a tread having in combination two plies, each formed of a sheet of fabric and sheet rubber and provided with a series of slits, said plies being arranged so that the corresponding slits of the different plies register throughout a small portion only of their length, hard metal studs having flat backs and thick heads connected by shanks arranged in the registering portions of the slits, whereby the studs are secured in place with the heads projecting outwardly, a protecting sheet of rubber secured to the inner surface of the inner ply by stitching through both plies to cover the flat backs of the studs, and a supplementary sheet of rubber vulcanized to the outer surface of the tread with holes to fit the stud heads, whereby the stud heads are substantially flush with the outer surface of the tread as described and shown.

5. In a non-skidding rubber tire, the combination with a tread made up of plies of material, each ply being composed of fabric combined with rubber, and being provided with a series of stud holes, of hard metal studs having heads and backs, said studs being arranged in said holes with the heads projecting outwardly, and a protecting sheet secured to the under surface of the plies by rows of stitching passing between the rows of studs.

6. A non-skidding rubber tire for bicycles, automobiles and other vehicles, comprising a tread composed of fabric combined with rubber and provided with a series of apertures for studs, and hard metal studs having heads and backs, the studs being arranged in the apertures with the heads extending outwardly, and a protecting sheet secured to the under surface of the tread over the backs of the studs by rows of stitching passing diagonally, back and forth, between the rows of studs.

In testimony whereof I have signed my name to this specification in the presence of two subscribing witnesses.

CALVIN THAYER ADAMS.

Witnesses:
H. C. TUXBURY,
M. McCABE.